United States Patent
Ishii et al.

(10) Patent No.: US 8,687,657 B2
(45) Date of Patent: Apr. 1, 2014

(54) BASE STATION APPARATUS AND METHOD IN MOBILE COMMUNICATION SYSTEM

(75) Inventors: Hiroyuki Ishii, Yokosuka (JP); Kohei Kiyoshima, Kawasaki (JP); Naoto Okubo, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 211 days.

(21) Appl. No.: 13/147,311

(22) PCT Filed: Jan. 29, 2010

(86) PCT No.: PCT/JP2010/051265
§ 371 (c)(1),
(2), (4) Date: Sep. 19, 2011

(87) PCT Pub. No.: WO2010/087449
PCT Pub. Date: Aug. 5, 2010

(65) Prior Publication Data
US 2012/0002616 A1  Jan. 5, 2012

(30) Foreign Application Priority Data
Feb. 2, 2009 (JP) ................................ 2009-021828

(51) Int. Cl.
*H04J 3/00* (2006.01)
(52) U.S. Cl.
USPC ............................ 370/503; 370/510; 370/520
(58) Field of Classification Search
USPC ........................................ 370/503, 510, 520
See application file for complete search history.

(56) References Cited

U.S. PATENT DOCUMENTS

| | | | | |
|---|---|---|---|---|
| 8,358,678 | B2* | 1/2013 | Eriksson et al. | 375/133 |
| 8,416,835 | B2* | 4/2013 | Ahn et al. | 375/132 |
| 2009/0257408 | A1* | 10/2009 | Zhang et al. | 370/336 |
| 2009/0279587 | A1* | 11/2009 | Eriksson et al. | 375/133 |
| 2009/0316758 | A1* | 12/2009 | Ahn et al. | 375/135 |
| 2010/0050040 | A1* | 2/2010 | Samuels et al. | 714/749 |
| 2012/0300993 | A1* | 11/2012 | Plamondon | 382/124 |
| 2013/0003553 | A1* | 1/2013 | Samuels et al. | 370/235 |

FOREIGN PATENT DOCUMENTS

WO  2008084977 A2  7/2008
WO  2008156414 A2  12/2008

OTHER PUBLICATIONS

3GPP TS 36.321 V8.4.0, Dec. 2008, "3rd Generation Partnership Project; Technical Specification Group Radio Access Network; Evolved Universal Terrestrial Radio Access (E-UTRA) Medium Access Control (MAC) protocol specification (Release 8)," 43 pages.

(Continued)

Primary Examiner — Jay P Patel
(74) Attorney, Agent, or Firm — Osha Liang LLP

(57) ABSTRACT

A base station apparatus determines which mode of a subframe bundling mode (second mode) and a non-bundling mode (first mode) should be used by a user apparatus for communication, and reports a determination result. In the first mode, RTT period is a first period, and each of transmission and retransmission of the signal is performed every 1 TTI. In the second mode, RTT period is a second period that is longer than the first period, and each of transmission and retransmission of the signal is performed every plurality of TTIs. A radio resource to be used for retransmission is determined according to a first frequency hopping pattern in the first mode, and is determined according to a second frequency hopping pattern that is different from the first frequency hopping pattern in the second mode.

7 Claims, 12 Drawing Sheets

(56) References Cited

OTHER PUBLICATIONS

3GPP TS 36.213 V8.5.0, Dec. 2008, "3rd Generation Partnership Project; Technical Specification Group Radio Access Network; Evolved Universal Terrestrial Radio Access (E-UTRA); Physical layer procedures (Release 8)," 74 pages.

International Search Report issued in PCT/JP2010/051265, mailed on May 11, 2010, with translation, 7 pages.

Written Opinion issued in PCT/JP2010/051265, mailed on May 11, 2010, 3 pages.

Office Action issued in corresponding Chinese Application No. 201080015472.4 dated Jun. 28, 2013 with English translation (17 pages).

* cited by examiner

BASE STATION APPARATUS AND METHOD IN MOBILE COMMUNICATION SYSTEM

TECHNICAL FIELD

The present invention relates to a technical field of mobile communications. More particularly, the present invention relates to a base station apparatus and a method in a mobile communication system.

BACKGROUND ART

In this kind of technical field, successors to the so-called third-generation mobile communication system are being studied by 3GPP, a standardization group for the wideband code division multiple access (W-CDMA) scheme. In particular, not only Long Term Evolution (LTE) but also further succeeding mobile communication schemes such as the IMT-Advanced scheme are being discussed, as successors of the W-CDMA scheme, the high speed downlink packet access (HSDPA) scheme, and the high speed uplink packet access (HSUPA) scheme and the like.

In a system such as LTE and the like, one or more resource blocks (RB) or resource units (RU) are allocated to a user apparatus (UE: User Equipment) both in downlink and uplink communications. Resource blocks are shared by multiple user apparatuses in the system. In LTE, the base station apparatus determines a user apparatus, among a plurality of user apparatuses, to which resource blocks are to be assigned every subframe which is 1 ms. The subframe may also be called a transmission time interval (TTI). The determination of assignment of radio resources is called scheduling. In the downlink, the base station apparatus transmits a shared channel using one or more resource blocks to a user apparatus selected in the scheduling. This shared channel is called a physical downlink shared channel (PDSCH). In the uplink, a user apparatus selected in the scheduling transmits a shared channel to the base station apparatus using one or more resource blocks. This shared channel is called a physical uplink shared channel (PUSCH).

In a communication system employing the shared channels, it is necessary to signal (or report) information indicating which user apparatus is assigned the shared channel in each subframe basically. A control channel used for the signaling is called a physical downlink control channel (PDCCH) or a downlink L1/L2 control channel. A downlink control signal may include, in addition to the PDCCH, a physical control format indicator channel (PCFICH) and a physical hybrid ARQ indicator channel (PHICH), and the like.

The PDCCH, for example, includes the following information:

Downlink scheduling information
Uplink scheduling grant, and
Transmission power control command bit The downlink scheduling information may include information regarding a downlink shared channel, for example. More particularly, the downlink scheduling information may include downlink resource block assignment information, identification information of a user apparatus (UE-ID), the number of streams, information regarding precoding vectors, data sizes, modulation schemes, and information regarding hybrid automatic repeat request (HARQ).

The uplink scheduling grant may include information regarding an uplink shared channel, for example. More particularly, the uplink scheduling grant includes uplink resource assignment information, identification information of a user apparatus (UE-ID), data sizes, modulation schemes, uplink transmission power information, and information regarding a demodulation reference signal used in uplink MIMO, and the like.

The PCFICH is used to report the format of the PDCCH. More specifically, the PCFICH is used to report the number of OFDM symbols to which the PDCCH is mapped. In LTE, the number of OFDM symbols to which the PDCCH is mapped is one, two, or three. The PDCCH is mapped from a top OFDM symbol of the subframe in order.

The PHICH includes acknowledgement/non-acknowledgement information (ACK/NACK) indicating whether retransmission is necessary for the PUSCH transmitted via uplink.

In the uplink, the PUSCH is used to transmit user data (a normal data signal) and control information accompanying the user data. Also, separately from the PUSCH, a physical uplink control channel (PUCCH) is provided to transmit, for example, a downlink channel quality indicator (CQI) and acknowledgement information (ACK/NACK) for the PDCCH. The CQI is used, for example, for scheduling processing and adaptive modulation and channel coding scheme (AMCS) processing of the physical downlink shared channel. In the uplink, a random access channel (RACH) and signals indicating assignment requests for uplink and downlink radio resources may also be transmitted as necessary.

As mentioned above, in the system of the LTE scheme and the like, communication of a user apparatus is performed using one or more resource blocks. Which resource block is usable should be signaled (reported) for each subframe in principle. Radio resources are required also for performing signaling. Since the radio resource used for signaling becomes an overhead for commutation of the shared data channel (physical shared channel), it is preferable that the radio resource used for signaling is small from the viewpoint of efficient transmission of a shared data channel. Based on this viewpoint, in the LTE scheme, radio resources for retransmission of the Hybrid Automatic Repeat Request (HARQ) in the uplink are predetermined such that radio resources are shifted by a predetermined frequency at predetermined time intervals. That is, retransmission control in the uplink is performed using a predetermined frequency hopping pattern in the synchronization type ARQ scheme. "Synchronization type" derives from the fact that timing for retransmission comes at predetermined intervals such as every 8 TTIs.

FIG. 1 shows a manner in which retransmission is performed using a predetermined frequency hopping pattern in the synchronization type ARQ scheme. A user apparatus transmits a signal using a radio resource shown as A1, and if retransmission is required, retransmission is performed after a round trip time (RTT). A radio resource used in the retransmission is shown as A2. It is checked whether retransmission is required in the period of RTT. Although not shown in the figure, the user apparatus checks whether retransmission is necessary by demodulating PHICH indicating the acknowledgement signal (ACK/NACK). If further retransmission is required after the user apparatus retransmits the signal using the radio resource of A2, the further retransmission is performed after RTT (A3). Each of the other users perform transmission and retransmission of signals in the same way (B1,B2,B3; C1,C2,C3).

A radio resource occupies one subframe (TTI) and a bandwidth (RB) of one or more resource blocks. Assignment of radio resources for each user is updated for each subframe, and transmission and retransmission of a signal are also performed for each subframe, in principle. However, the signal of one subframe does not necessarily provide proper reception quality at all times. For example, quality of a signal from a user apparatus residing in a cell edge tends to become lower than quality of a signal from a user apparatus near a base station. For addressing such concern, there is a technique called subframe bundling (also may be called TTI Bundling). In this technique, radio resources over a plurality of subframes (four TTIs, for example) are assigned to a particular user apparatus at one time, so as to improve signal quality from a user residing in the cell edge. After that, transmission and retransmission from the user apparatus are performed every multiple subframes as a whole.

FIG. 2 schematically shows a manner in which the subframe bundling is performed. Different from the case shown in FIG. 1, if retransmission is required after a signal is transmitted using a radio resource of 4 TTIs shown as A1 (occupying a bandwidth of one resource block in the frequency direction), the retransmission is also performed by using a radio resource (A2) of 4 TTIs. In the case of FIG. 2, since the user apparatus can transmit a signal using a radio resource four times greater than the radio resource in the case of FIG. 1, reception quality can be improved.

The subframe bundling is described in the non-patent documents 1 and 2, for example.

RELATED ART DOCUMENT

[Non-patent document 1] 3GPP TS36.321 V8.4.0 (2008-12), Sec.5.4.2
[Non-patent document 2] 3GPP TS36.213 V8.5.0 (2008-12), Sec.8

SUMMARY OF THE INVENTION

Problem to be Solved by the Invention

By the way, in the synchronization type HARQ, it is preferable that the round trip time (RTT) is short from the viewpoint of decreasing delay in communication. On the other hand, a minimum required period as RTT is different according to whether operation is performed in the subframe bundling mode or in other operation modes (non-bundling mode). The reason is that, in the case of the subframe bundling mode, different from the non-bundling mode, it is necessary to consider the period of the number of bundled subframes. Thus, for example, RTT for the case of the non-bundling mode may be set to be 8 TTIs, and RTT for the case of the subframe bundling mode may be set to be 16 TTIs. That is, it can be considered that RTT is allowed to be different according to user apparatuses.

However, according to that, there is fear that collision is more likely to occur between a radio resource used for retransmission by a user apparatus of an RTT and a radio resource used for retransmission by a user apparatus of another RTT.

FIG. 3 shows a manner in which a first user apparatus of RTT=8 TTIs and a second user apparatus of RTT=16 TTIs try to use the same radio resource for retransmission respectively.

In general, when radio resources are assigned in a fixed frequency hopping pattern, it is difficult to completely eliminate collision of radio resources between users. For example, in the case of the example of FIG. 1, it is assumed that a signal is transmitted (A1), retransmitted (A2), and after that, retransmitted again (A3). In this case, the re-retransmission signal (A3) may collide with an initial transmission of another user apparatus. It is difficult to completely eliminate the general fear of collision as long as a fixed frequency hopping pattern is used. However, when coexistence of user apparatuses of different RTTs as mentioned above is allowed, there is a fear that a risk may largely increases in which the same radio resource is used for retransmission of each user apparatus. Collision of radio resources deteriorates signal quality of both sides, and could cause a negative effect on throughput of the system.

An object of the present invention is to reduce a fear that two or more communication apparatuses in which RTTs are different with each other use the same radio resource for retransmission respectively in a mobile communication system in which the synchronization type ARQ is performed and radio resources for retransmission are determined according to a predetermined hopping pattern.

Means for Solving the Problem

According to an embodiment of the present invention, a base station apparatus for use in a mobile communication system in which synchronization type automatic retransmission control is performed is used. The base station apparatus includes:

a determination unit configured to determine which mode of a subframe bundling mode and a non-bundling mode should be used by a user apparatus for communication;

a control signal generation unit configured to generate a control signal that includes information of a determination result; and a transmission unit configured to transmit the control signal to the user apparatus, wherein the control signal generation unit generates the control signal such that, in the case of the non-bundling mode, a round trip time (RTT) from transmission of a signal by the user apparatus to retransmission of the signal is a first period, and each of transmission and retransmission of the signal is performed by a radio resource over a unit transmission period, in the case of the subframe bundling mode, the round trip time is a second period longer than the first period, and each of transmission and retransmission of the signal is performed by a radio resource over a plurality of unit transmission periods, and a radio resource to be used for retransmission by the user apparatus of the non-bundling mode is determined according to a first frequency hopping pattern, and a radio resource to be used for retransmission by the user apparatus of the subframe bundling mode is determined according to a second frequency hopping pattern that is different from the first frequency hopping pattern.

Effect of the Present Invention

According to an embodiment of the present invention, in a mobile communication system in which the synchronization type ARQ is performed and radio resources for retransmission are determined according to a predetermined hopping pattern, the fear that two or more communication apparatuses in which RTTs are different with each other use the same radio resource for retransmission respectively can be reduced.

EMBODIMENTS FOR CARRYING OUT THE INVENTION

A base station apparatus according to an embodiment of the present invention determines which mode of a subframe bundling mode and a non-bundling mode should be used by a user apparatus for communication, and transmits a control signal including a determination result to the user apparatus. RTT in the non-bundling mode is shorter than RTT in the subframe bundling mode. A radio resource to be used for retransmission by the user apparatus of the non-bundling mode is determined according to a first frequency hopping pattern, and a radio resource to be used for retransmission by the user apparatus of the subframe bundling mode is determined according to a second frequency hopping pattern that is different from the first frequency hopping pattern.

Accordingly, the fear that two or more user apparatuses in which RTTs are different with each other may use the same radio resource for retransmission respectively can be reduced easily and effectively.

The first and the second hopping patterns may be any proper patterns different with each other. For example, in one frequency hopping pattern, a radio resource used for transmission of a signal is separated from a radio resource used for retransmission of the signal by a predetermined bandwidth, and in another frequency hopping pattern, a bandwidth between a radio resource used for transmission of a signal and a reference frequency is the same as a bandwidth between a radio resource used for retransmission of the signal and the reference frequency. It is desirable to use such patterns from the viewpoint to easily specify a frequency hopping pattern from a radio resource of a starting point.

One radio resource may occupy one subframe and a predetermined frequency bandwidth. A radio resource that becomes a start point of the first frequency hopping pattern or the second frequency hopping pattern may be assigned to each user apparatus starting from a predetermined number of subframes in a low frequency side in order. Such restriction of assignment is preferable from the viewpoint that, the fear that two or more user apparatuses in which RTTs are different with each other may use the same radio resource for respective retransmission can be reduced further reliably.

An embodiment of the present invention is described in terms of the following items.
1. Principle of invention
2. Operation example
3. Base station apparatus
4. User apparatus
5. Modified example Embodiment 1

1. Principle of Invention

Figure 1:
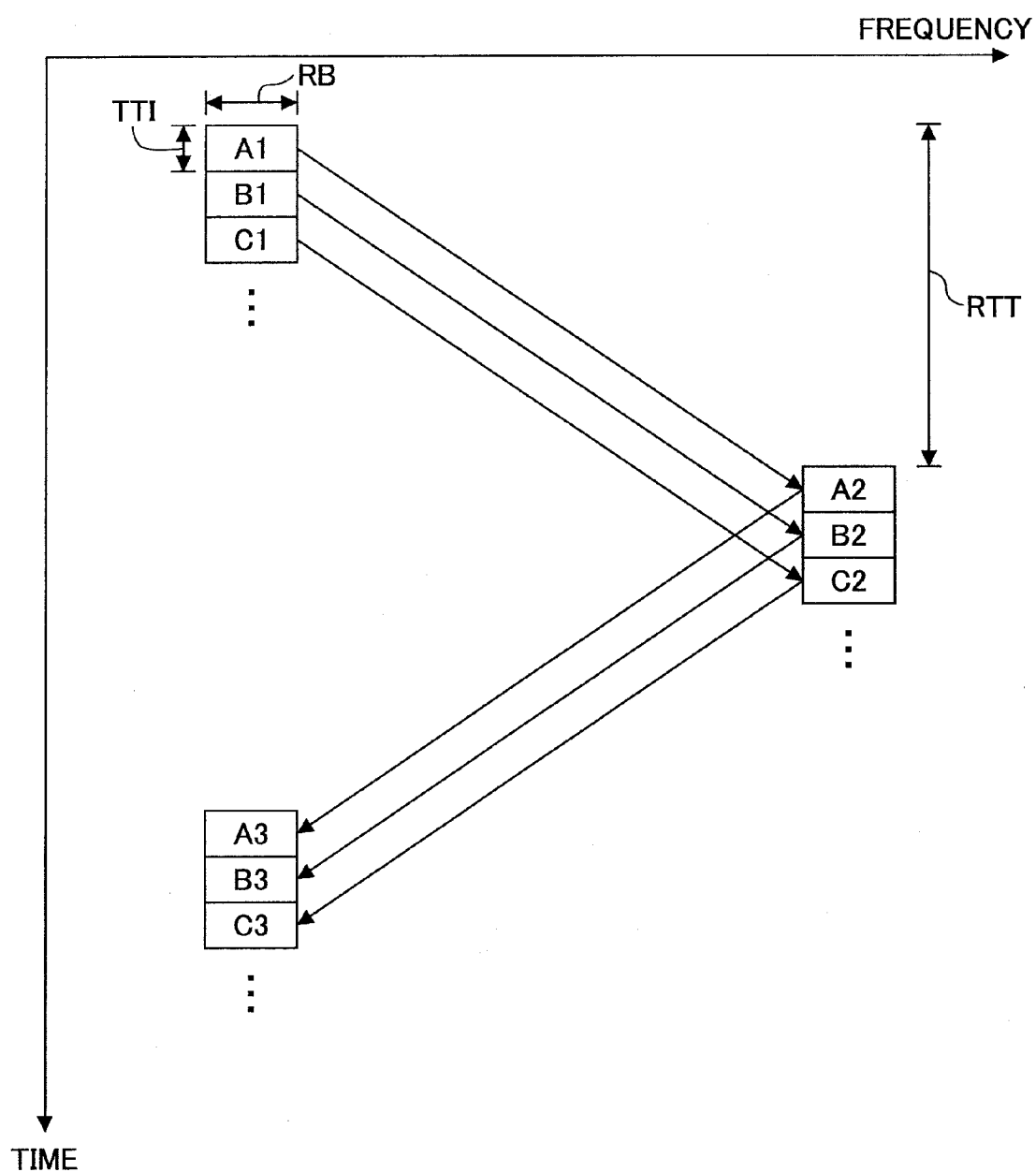
FIG. 1 is a diagram schematically showing a manner in which retransmission is performed using a frequency hopping pattern in the synchronization type ARQ scheme.
Figure 2:
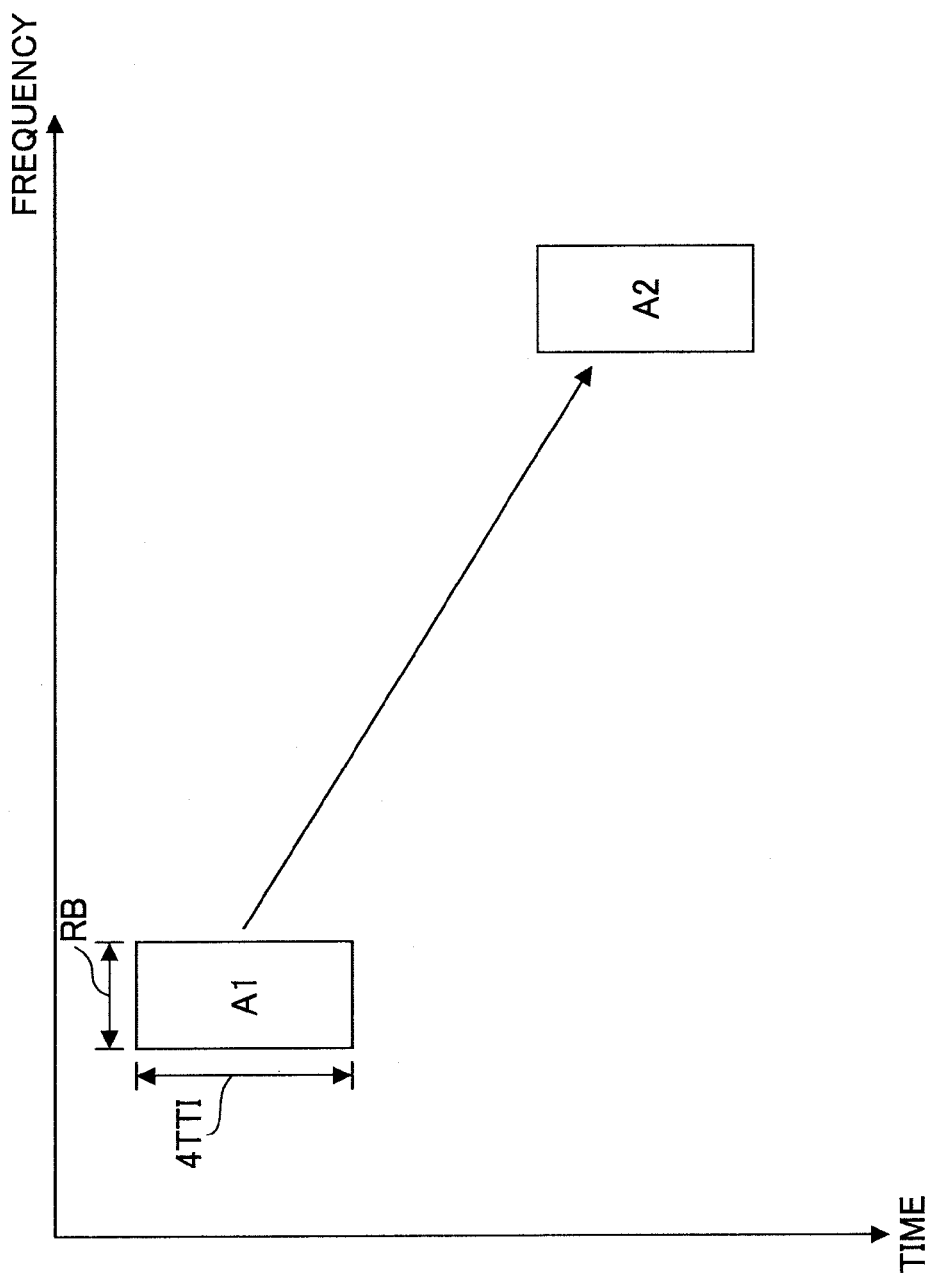
FIG. 2 is a diagram schematically showing a manner in which subframe bundling is performed.
Figure 3:
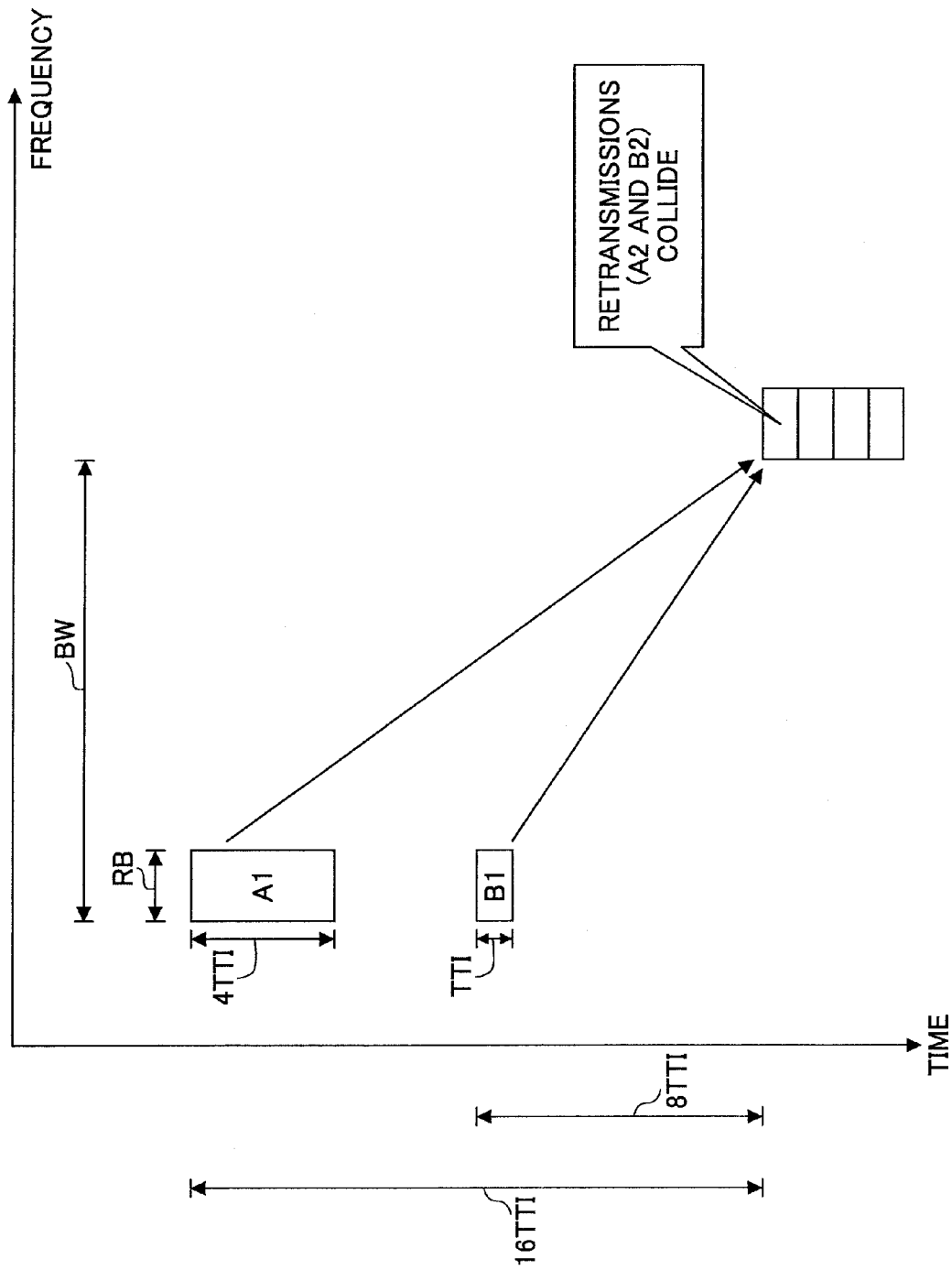
FIG. 3 is a diagram showing a problem that two user apparatuses of different RTTs use the same radio resource for respective retransmission.
Figure 4:
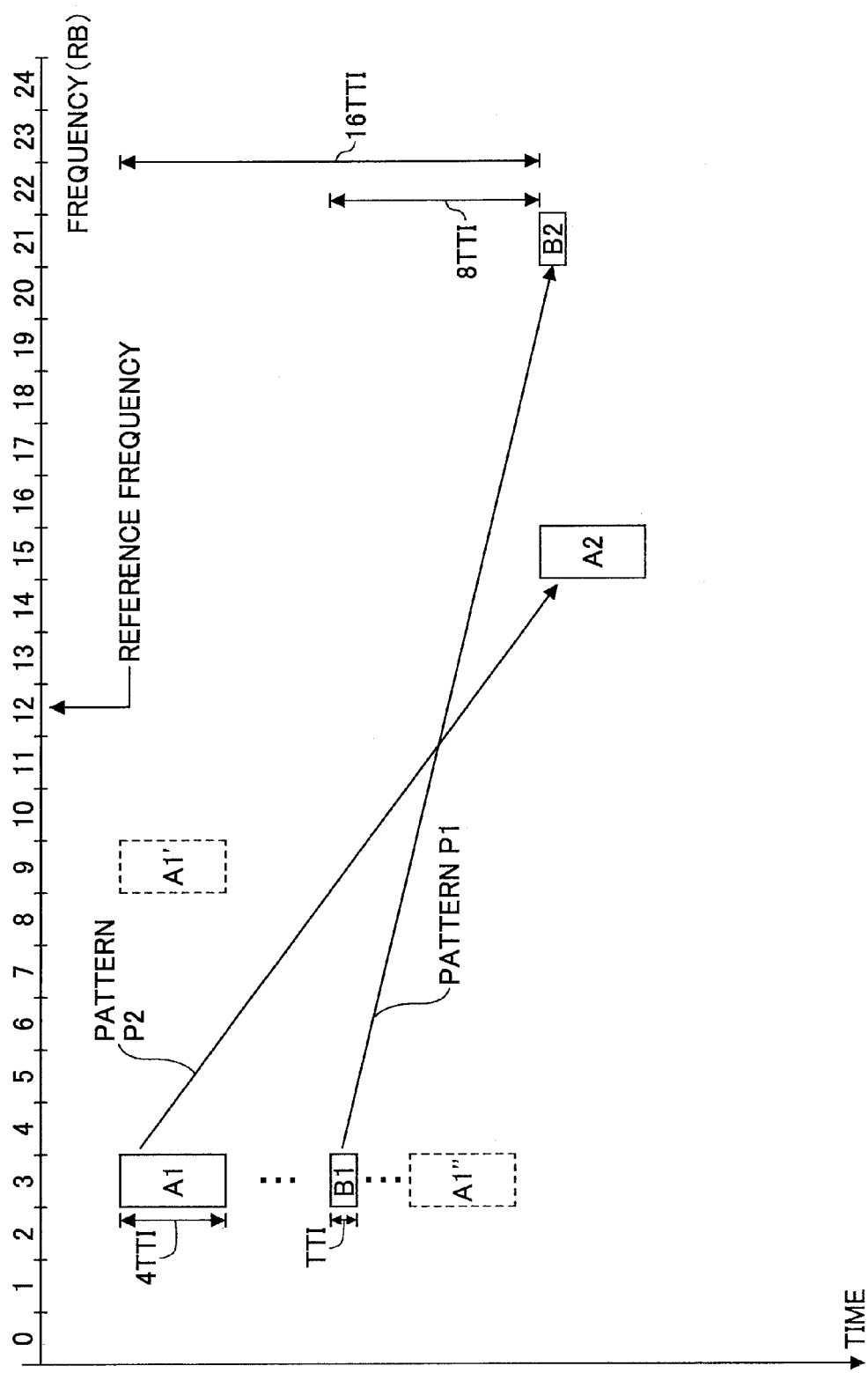
FIG. 4 is a diagram for explaining a principle of the present invention.

FIG. 4 is a diagram for explaining the principle of the present invention. Similarly to FIGS. 1-3, the lateral axis indicates frequency, and the vertical axis indicates time. In FIG. 4, resource block numbers are shown in the lateral axis, and FIG. 4 indicates that 25 resource blocks in total are included in a system bandwidth (5 MHz, for example). The concrete numerical numbers such as the number of resource blocks and the system bandwidth and the like are merely examples, and any proper numbers may be used.

Similarly to the case of the example of FIG. 3, the RTT of a user apparatus that does not perform subframe bundling is 8 TTIs. The RTT of a user apparatus performing subframe bundling is 16 TTIs. FIG. 4 is similar to the case of FIG. 3 in the point that user apparatuses of different RTTs coexist. In the case of the example shown in FIG. 4, a retransmission radio resource of the user apparatus of RTT=8 TTIs is specified according to a first frequency hopping pattern P1. A retransmission radio resource of the user apparatus of RTT=16 TTIs is specified according to a second frequency hopping pattern P2 which is different from the first frequency hopping pattern. In the case of the example shown in FIG. 3, for both of the user apparatus of RTT=8 TTIs and the user apparatus of RTT=16 TTIs, a radio resource of the initial transmission is separated from a radio resource of retransmission by the same bandwidth BW. On the other hand, in the case of the example shown in FIG. 4, the user apparatus of RTT=8 TTIs transmits an initial signal using a resource block RB3 (B1), and retransmits a signal using RB21 (B2). The user apparatus of RTT=16 TTIs transmits an initial signal using a resource block RB3 (A1), but it uses RB15 for retransmission (A2). That is, the user apparatuses of RTT=8 TTIs and RTT=16 TTIs perform retransmission using hopping radio resources while moving between different bandwidths. The former user apparatus follows a pattern P1 hopping between RB3 and RB21. The latter user apparatus follows a pattern P2 hopping between RB3 and RB15. By the way, for the sake of simplicity of the explanation, "initial" and "retransmission" are described.

However, the present invention can be applied widely to cases such as retransmission and re-retransmission as well as the case of initial and retransmission.

More particularly, in the case of pattern P1, the radio resource for retransmission is determined by a mirroring method.

Figure 5:
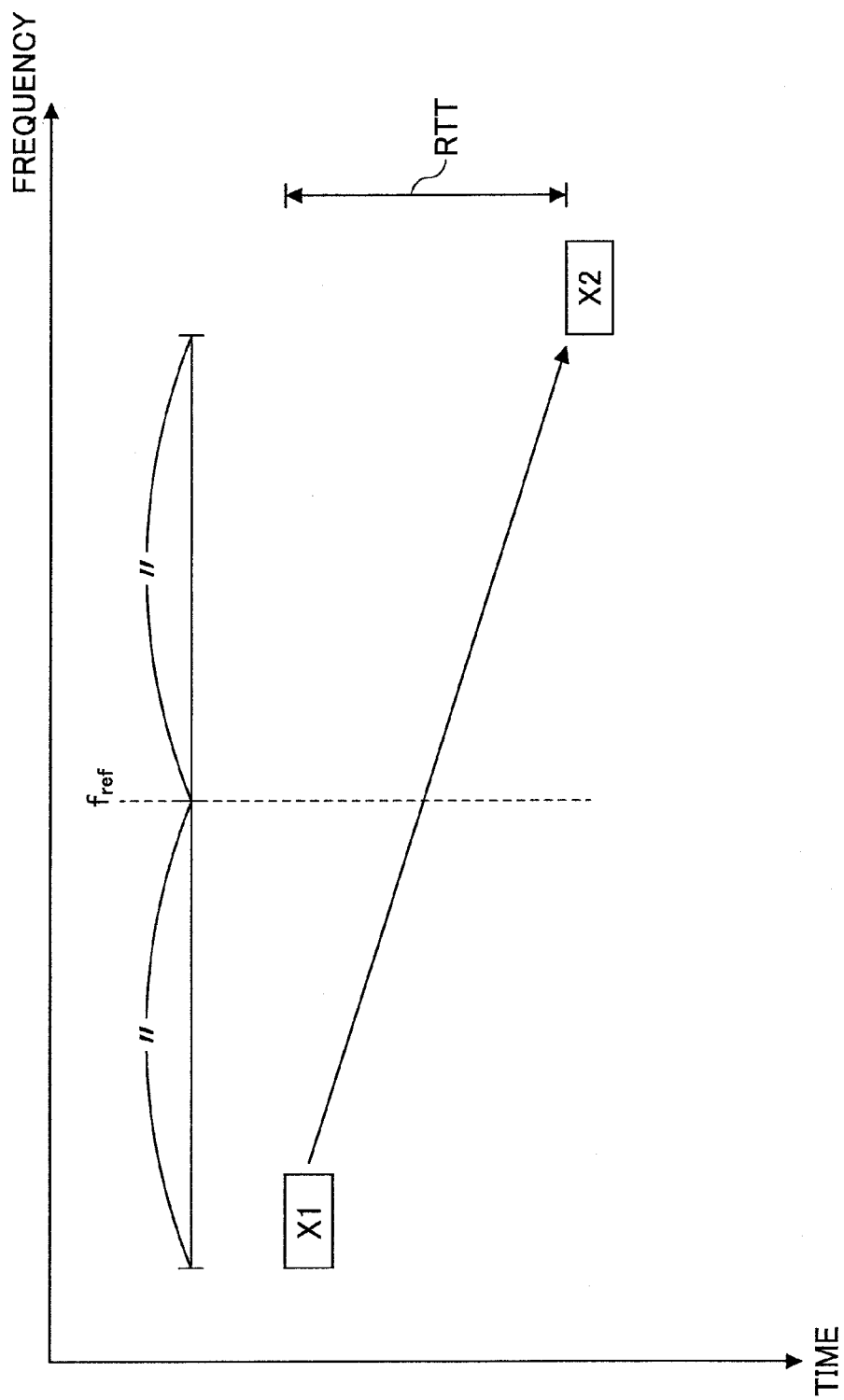
FIG. 5 is a diagram for explaining a mirroring method.

FIG. 5 is an explanatory diagram for explaining the mirroring method. In the case of the mirroring method, a frequency (resource block) of a radio resource X1 used for the initial signal transmission and a frequency (resource block) of a radio resource X2 to be used for retransmission are symmetric with respect to a reference frequency $f_{ref}$. However, they are shifted in the time direction by the round trip time RTT with each other. In the case of the example shown in FIG. 4, the reference frequency corresponds to the frequency of the resource block RB12. Retransmission for the signal transmitted using the radio resource B1 (RB3) is performed using the radio resource B2 (RB21) that is at a symmetric position with respect to the reference frequency $f_{ref}$. Since resource blocks that are symmetric with each other with respect to the reference frequency $f_{ref}$ are used for transmission and retransmission of the signal, the hopping amount in the frequency direction becomes different according to position relationship with the reference frequency $f_{ref}$. The farther from the reference frequency the resource block is, the wider the width of hopping becomes, and the closer to the reference frequency the resource block is, the narrower the width of hopping becomes.

In the case of pattern 2, a radio resource for retransmission is determined by a shifting method.

Figure 6:
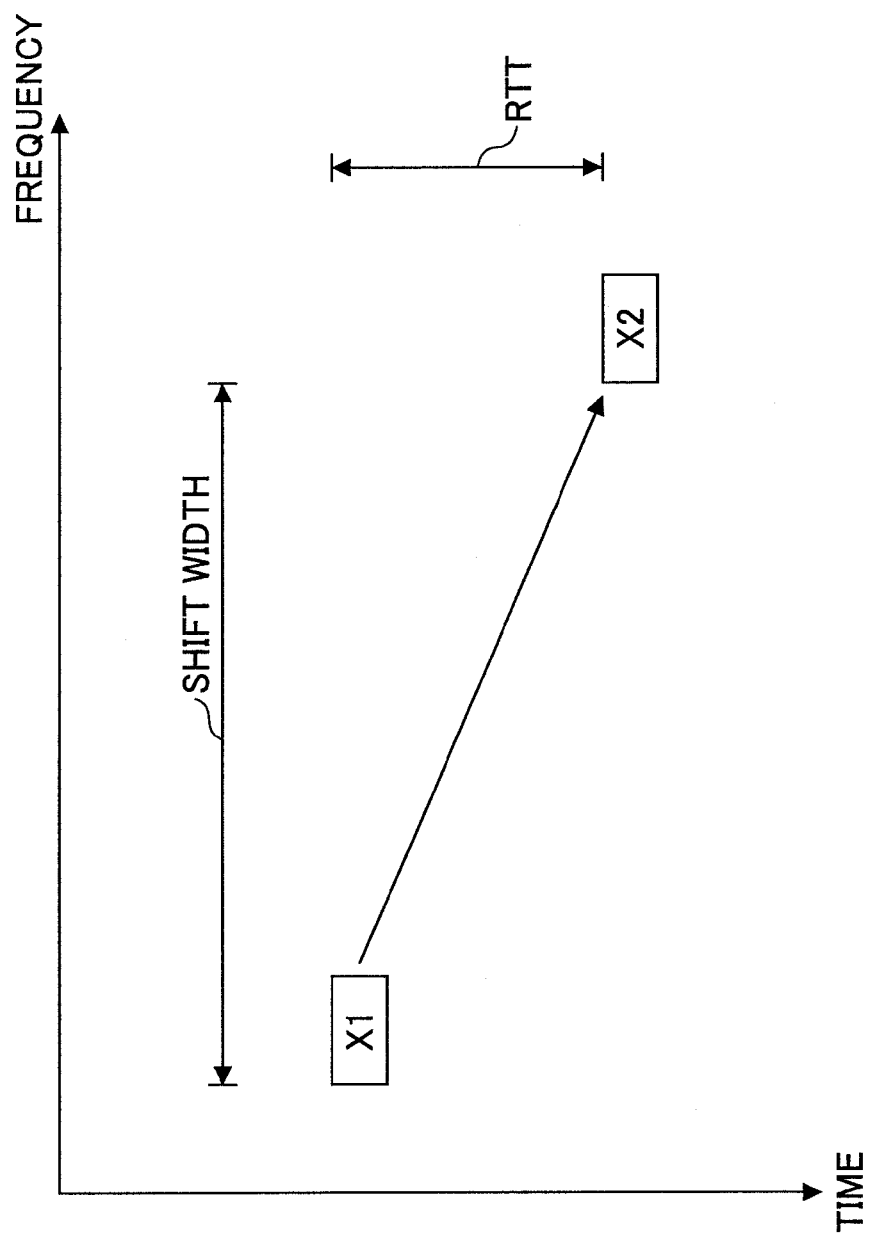
FIG. 6 is a diagram for explaining a shifting method.

FIG. 6 is an explanatory diagram for explaining the shifting method. In the case of the shifting method, a frequency (resource block) of a radio resource X1 used for the initial signal transmission and a frequency (resource block) of a radio resource X2 to be used for the retransmission are shifted with respect to each other by a certain shift width. They are shifted with each other by a round trip time RTT in the time direction. Although the shift width may be selected from the viewpoint of N-th part of a system bandwidth (N is a natural number equal to or greater than 2, and N is 2, for example), it may be determined from another viewpoint. For example, the shift width may be determined as a bandwidth occupied by a predetermined number of resource blocks. In the case of the example shown in FIG. 4, the shift width is a width of 12 resource blocks, which corresponds to about half of the whole system bandwidth. In the case of shifting method, when performing retransmission, each user uses a resource block that is different by a predetermined shift width in frequency.

In the example shown in FIG. 4, the pattern P1 is a pattern by the mirroring method, and the pattern P2 is a pattern by the shifting method. Conversely, the pattern P1 may be a pattern by the shifting method, and the pattern P2 may be a pattern by the mirroring method. Further, the pattern P1, P2 may be a pattern derived by a method other than the mirroring method and the shifting method. By the way, for example, as one of hopping patterns, a pattern may be included in which hopping is not performed, that is, retransmission is performed using the same resource block as that used in the initial transmission. Whatever pattern is used, when a plurality of user apparatuses of different RTTs perform retransmission, each user apparatus uses a different frequency pattern, so that the risk that both user apparatuses use the same radio resources for retransmission can be reduced.

It is assumed that a user apparatus performing subframe bundling transmits a signal using a radio resource (RB9 and 4 TTIs) shown by a dashed line box A1', then, the user apparatus had to retransmit the signal after 16 TTIs. According to the pattern P2, the user apparatus needs to use RB21 over 4 TTIs for retransmission after 16 TTIs, which may cause a fear that collision between the resource for the retransmission and the radio resource of B2 may occur. Such a fear can be reduced by imposing a certain restriction when assigning, to each user apparatus, a radio resource that becomes a start point of first or second frequency hopping (P1, P2) for the retransmission radio resource. More particularly, the radio resource that becomes a start point of first or second frequency hopping (A1, PA) is assigned to each user apparatus starting from a predetermined number of subframes in the low frequency side in order. Therefore, the radio resource (RB3 and 4 TTIs) shown by the dashed line box A1" is assigned in priority to the radio resource (RB9 and 4 TTIs) shown by the dashed line box A1'. Accordingly, the above-mentioned fear can be reduced by assigning retransmission radio resources to user apparatuses in order starting from a predetermined number of subframes (16 subframes, for example) in the low frequency side.

2. Operation Example

Figure 7:
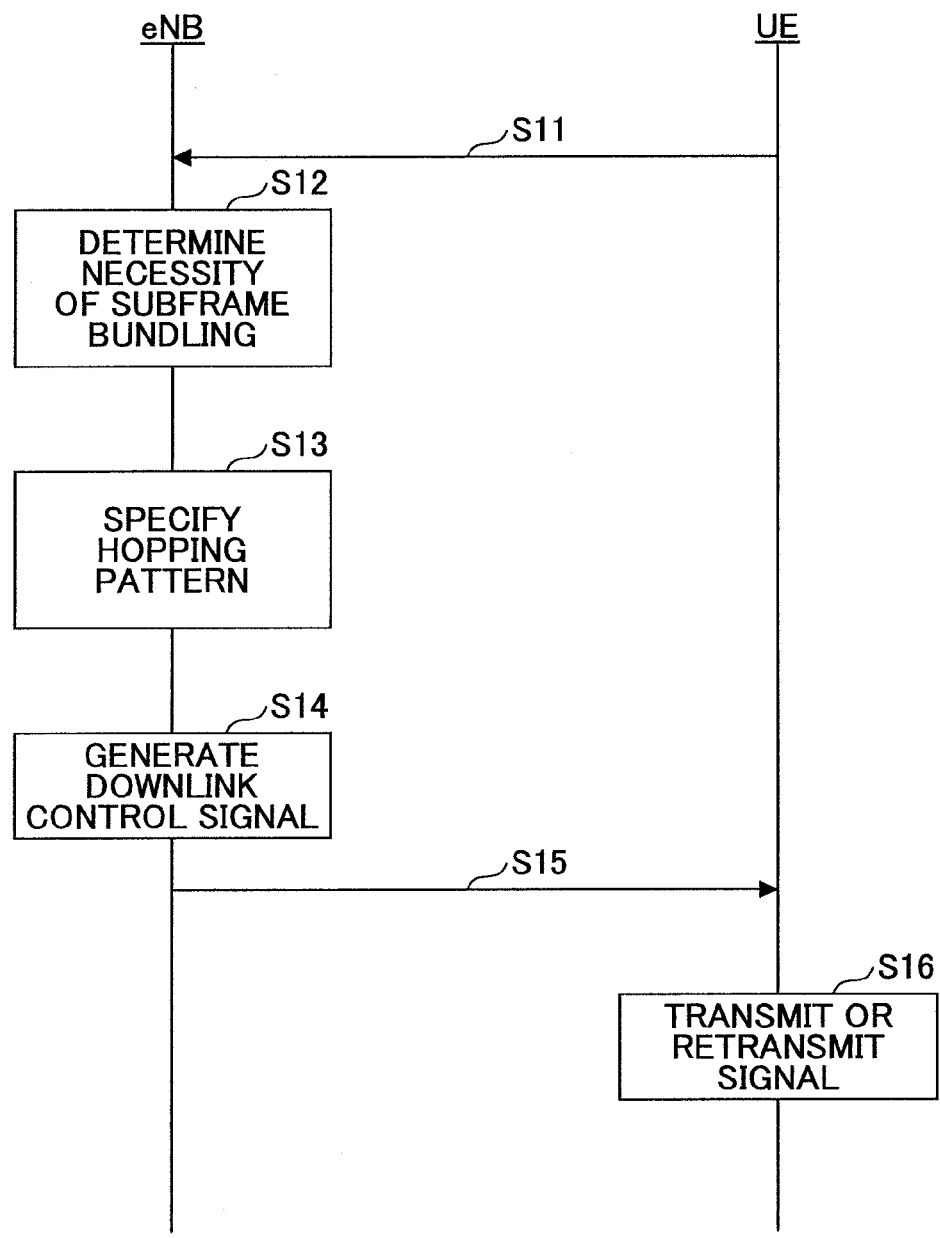
FIG. 7 is a flowchart showing an operation example according to an embodiment of the present invention.

FIG. 7 shows an operation example according to an embodiment of the present invention. Although an operation example is described for a communication apparatus of the LTE scheme for the sake of convenience of explanation, the present invention may be applied to any proper communication system in which the synchronous type retransmission control is performed. The user apparatus UE resides in a cell of a base station apparatus eNB, so that the user apparatus UE can communicate with a communication correspondent via the base station apparatus eNB.

In step S11, the user apparatus UE reports reception level and other information to the base station apparatus eNB. The reception level may be represented as any proper amount such as RSSI, CQI, SIR, CIR and $E_b/N_0$. Not only an instantaneous value of the reception level but also average reception level such as path loss may be reported to the base station apparatus eNB. Calculation of the path loss may be performed by the user apparatus UE or by the base station apparatus eNB. The other information may include information indicating maximum transmission power of the user apparatus UE, and power headroom and the like. That is, the base station apparatus eNB may calculate a path loss based on the value of the power headroom reported from the user apparatus UE and a calculation equation of the power headroom. Or, the base station apparatus eNB may estimate a transmission power of the user apparatus UE from the value of the power headroom reported from the user apparatus UE so as to calculate the path loss based on the transmission power and the reception power of the signal received from the user apparatus UE.

In step S12, the base station apparatus eNB determines whether subframe bundling should be performed in communication for each user apparatus according to communication state of respective user apparatuses. If subframe bundling is not required for communication of a user apparatus, assignment of radio resource and transmission of a signal for the user apparatus are performed in units of one subframe. If subframe bundling is required for communication of a user apparatus, assignment of radio resource and transmission of a signal for the user apparatus are performed in units of a plurality of subframes. Whether subframe bundling is required or not may be determined based on any proper criteria. As an example, communication of a user apparatus residing in a cell edge may be determined such that subframe bundling is required. Also, for example, the base station apparatus eNB may determine whether a user apparatus UE is residing at the cell edge, that is, whether subframe bundling should be performed, based on path loss (propagation loss) reported from the user apparatus UE.

In step S13, it is specified that the radio resource for signal retransmission of the user apparatus should follow which frequency hoping pattern. In the present embodiment, one of the hopping pattern P1 by mirroring and the hopping pattern P2 by shifting is specified according to whether subframe bundling is performed (that is, according to length of RTT). In any hopping pattern, it is necessary that a radio resource (resource block and subframe, A1, B1, A1" of FIG. 4) that becomes a start point of the pattern is determined. But, it is not necessary that the radio resource is determined at the time of S13. It is desirable that the radio resource (A1,B1,A1") that becomes the start point of the frequency hopping pattern is assigned to each user apparatus starting from a predetermined number of subframes in the low frequency side in order.

In step S14, a downlink control signal to be reported to the user apparatus is generated. Information reported by the downlink control signal may include information determined in steps S12 and S13 in addition to system information and scheduling information and the like. For example, the downlink control information may include whether a specific user apparatus should operate in the subframe bundling mode, and include which frequency hopping pattern should be used for retransmission. As candidates of the downlink control signal, there are a broadcast channel (BCH), an RRC message, a downlink physical control channel PDCCH (UL-Grant, especially) and the like.

In step S15, information is reported to the user apparatus at the residing cell using the downlink control signal. Whether the user apparatus operates in the subframe bundling mode and a location of the radio resource that becomes a start point of frequency hopping and the like are reported by individual control signals. Also, the base station apparatus may report, to the user apparatus, information indicating what frequency hopping patterns are there in the cell by using system information (BCH) in general, or the information may be reported individually.

In step S16, each user apparatus transmits or retransmits a signal according to information reported from the base station apparatus.

3. Base Station Apparatus

Figure 8:
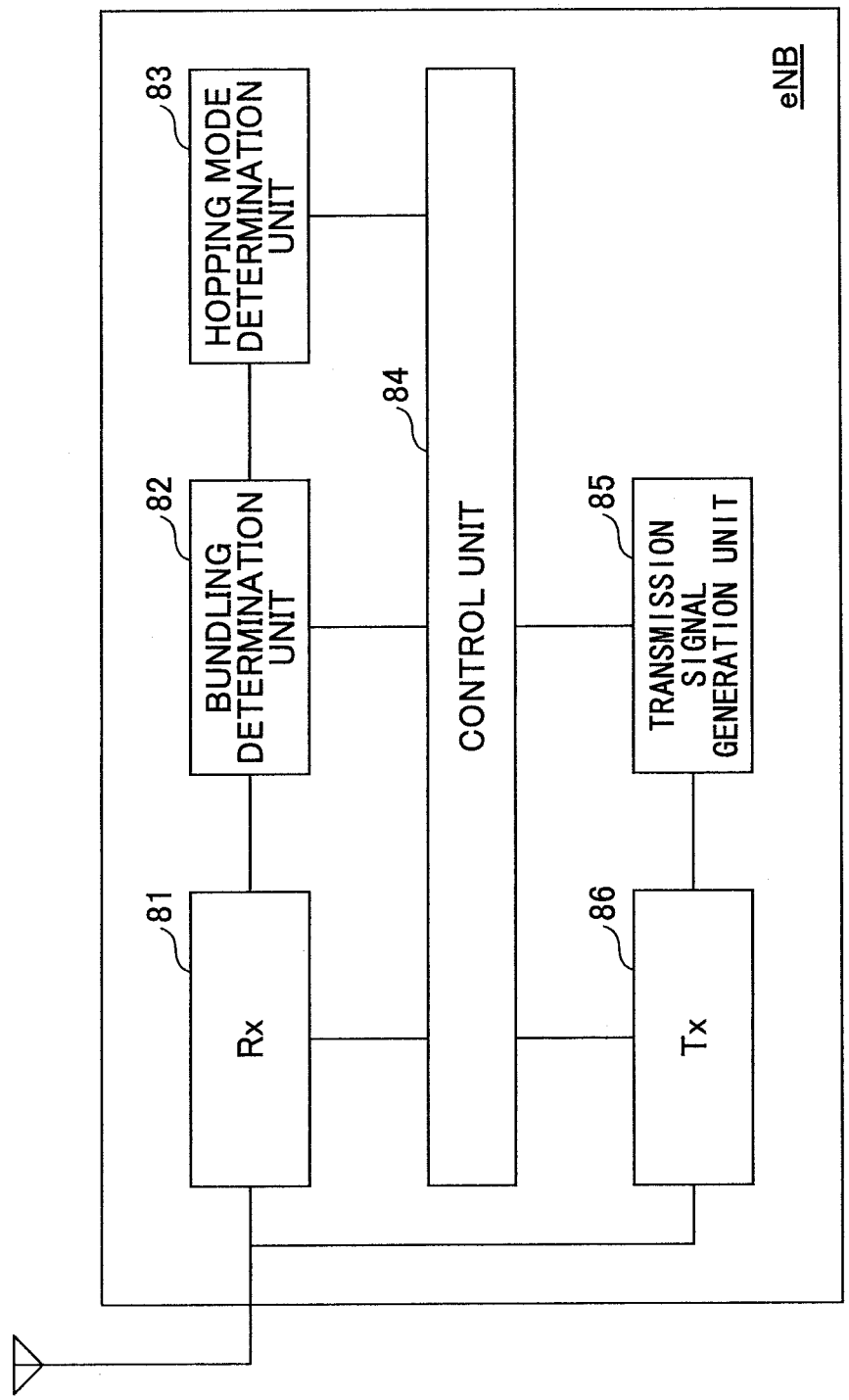
FIG. 8 is a functional block diagram of a base station apparatus according to an embodiment of the present invention.

FIG. 8 shows a functional block diagram of the base station apparatus according to an embodiment of the present invention. FIG. 8 shows a receiving unit (Rx) 81, a bundling determination unit 82, a hopping mode determination unit 83, a control unit 84, a transmission signal generation unit 85, and a transmission unit (Tx) 86.

The receiving unit (Rx) 81 receives an uplink control signal, a data signal and the like from the user apparatus UE, and demodulates the signal.

The bundling determination unit 82 determines whether the user apparatus should operate in the subframe bundling mode based on the reception level, information on path loss, and the power headroom and the like reported from the user apparatus UE. As an example, communication of a user apparatus residing in a cell edge may be determined to require subframe bundling. For example, the bundling determination unit 82 may determine whether the user apparatus UE resides in the cell edge, that is, whether the user apparatus UE should perform subframe bundling based on the path loss (propagation loss) reported from the user apparatus UE. More particularly, it may be determined to perform subframe bundling when the value of the path loss is equal to or greater than a predetermined threshold, and determined not to perform subframe bundling when the value of the path loss is less than a predetermined threshold.

The hopping mode determination unit 83 determines a frequency hopping pattern that can be used when the user apparatus performs retransmission of a signal. The frequency hopping pattern may be any proper pattern. As an example, hopping may be performed every predetermined RTTs in the time axis direction, and performed by a method determined based on the mirroring method or the shifting method in the frequency axis direction.

The control unit 84 controls operation of each configuration element in the base station apparatus eNB.

The transmission signal generation unit 85 generates a transmission signal such as a downlink control signal and a downlink data signal.

The transmission unit (Tx) 86 converts a digital transmission signal generated by the transmission signal generation unit 85 into a radio signal, and transmits the signal by radio.

4. User Apparatus

Figure 9:
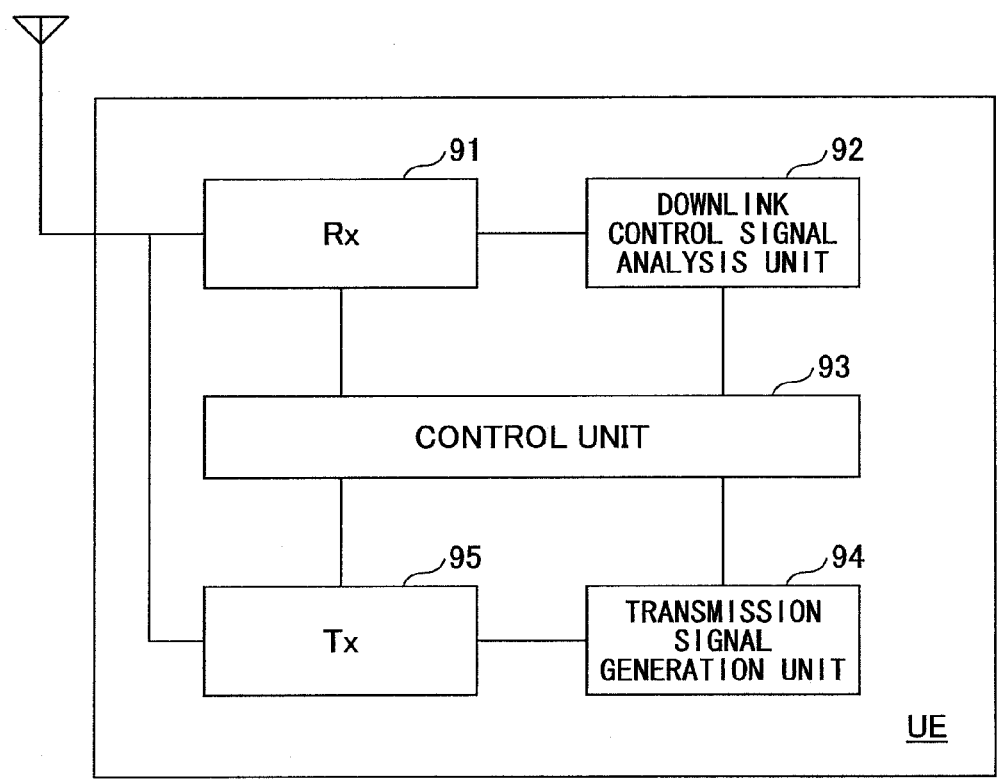
FIG. 9 is a functional block diagram of a user apparatus according to an embodiment of the present invention.

FIG. 9 shows a functional block diagram of the user apparatus UE according to an embodiment of the present invention. FIG. 9 shows a receiving unit (Rx) 91, a downlink control signal analysis unit 92, a control unit 93, a transmission signal generation unit 94, and a transmission unit (Tx) 95.

The receiving unit (Rx) 91 receives a downlink control signal and a downlink data signal from the base station apparatus eNB, and demodulates the signal.

The downlink control signal analysis unit 92 analyses information in the downlink control signal. In the case of the present embodiment, in addition to processing such as checking of resource assignment of scheduling information, the downlink control signal analysis unit 92 determines whether the user apparatus UE should operate in the subframe bundling mode, and determines a start point of the frequency hopping for the retransmission radio resource. When the frequency hopping method is based on the mirroring method, it is necessary that the reference frequency $f_{ref}$ is specified. When the frequency hopping method is based on the shifting method, it is necessary that a shift width is specified. RTT that is a period from transmission of a signal to retransmission is longer in the case of the subframe bundling mode than the case of the non-bundling mode. For example, former RTT is 8 TTIs, and the latter is 16 TTIs. In the case of the present embodiment, the downlink control signal may be generated such that frequency hopping methods of different patterns are used by respective user apparatuses according to difference of RTT. For example, correspondence relationship between operation modes of the subframe bundling mode and the non-bundling mode and RTTs is known beforehand for the user apparatus, and the user apparatus may receive a notification of an operation mode and a radio resource of a start point by a control signal.

The control unit 93 controls operation of configuration elements in the user apparatus UE.

The transmission signal generation unit 94 generates a digital transmission signal including an uplink control signal and an uplink data signal and the like.

The transmission unit (Tx) 95 converts the digital transmission signal generated in the transmission signal generation unit 94 into a radio signal, and transmits the signal by radio. When the user apparatus operates in the subframe bundling mode, the signal is transmitted over a period in which a plurality of subframes continue, and also, retransmission is performed over a period of a plurality of continuous subframes.

5. Modified Example

In the above explanation, a case is described in which, when the subframe bundling is applied, transmission of 4 TTIs (4 subframes) in the initial transmission is performed using the same resource block, and transmission of 4 TTIs (4 subframes) in the retransmission is performed using a resource block based on a predetermined hopping pattern.

Figure 10:
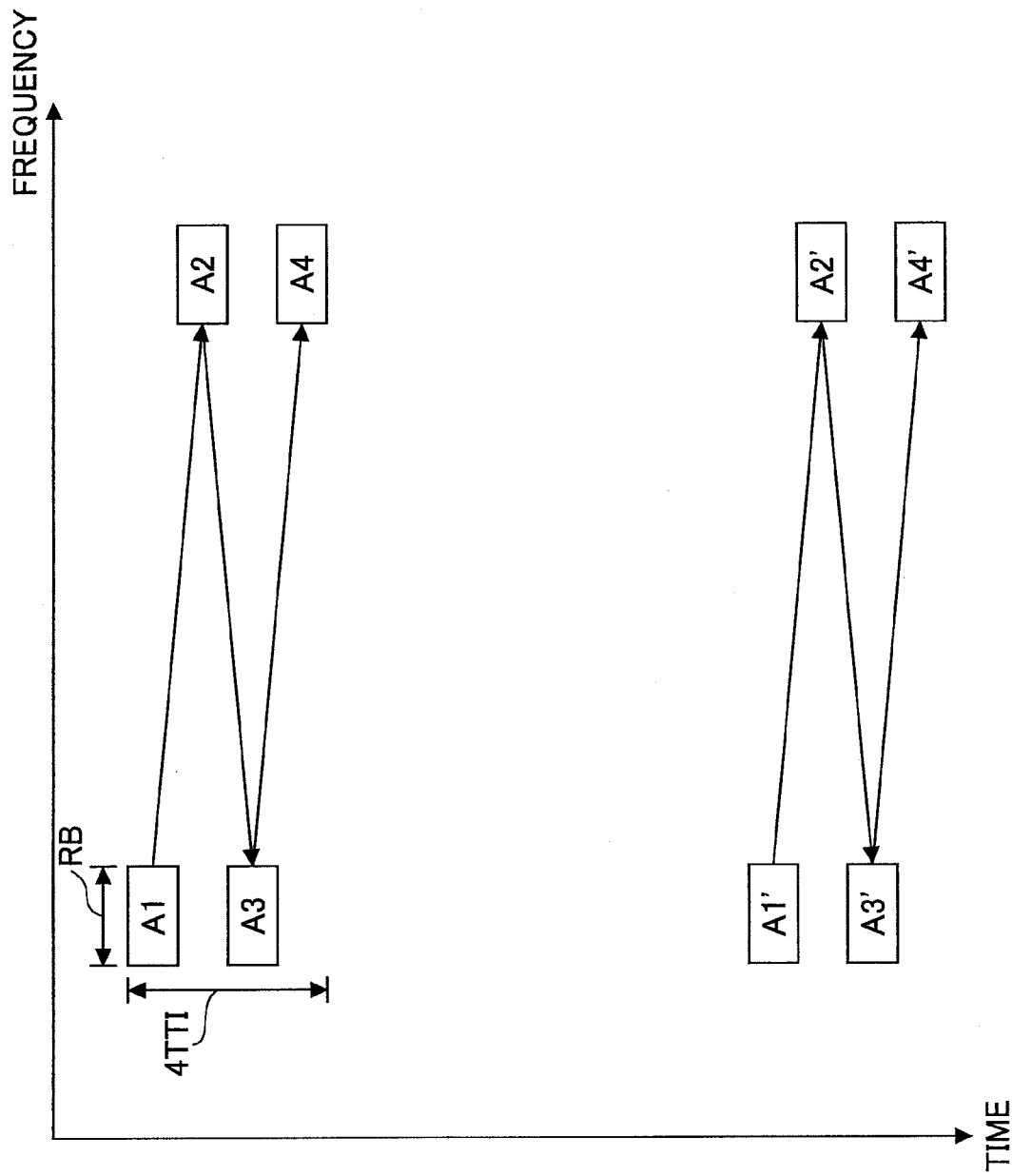
FIG. 10 is a diagram schematically showing a manner in which subframe bundling is performed with frequency hopping.

However, when the subframe bundling is applied, hopping may be applied within the 4 TTIs (4 subframes) in the initial transmission based on a predetermined hopping pattern as shown in FIG. 10.

Figure 11:
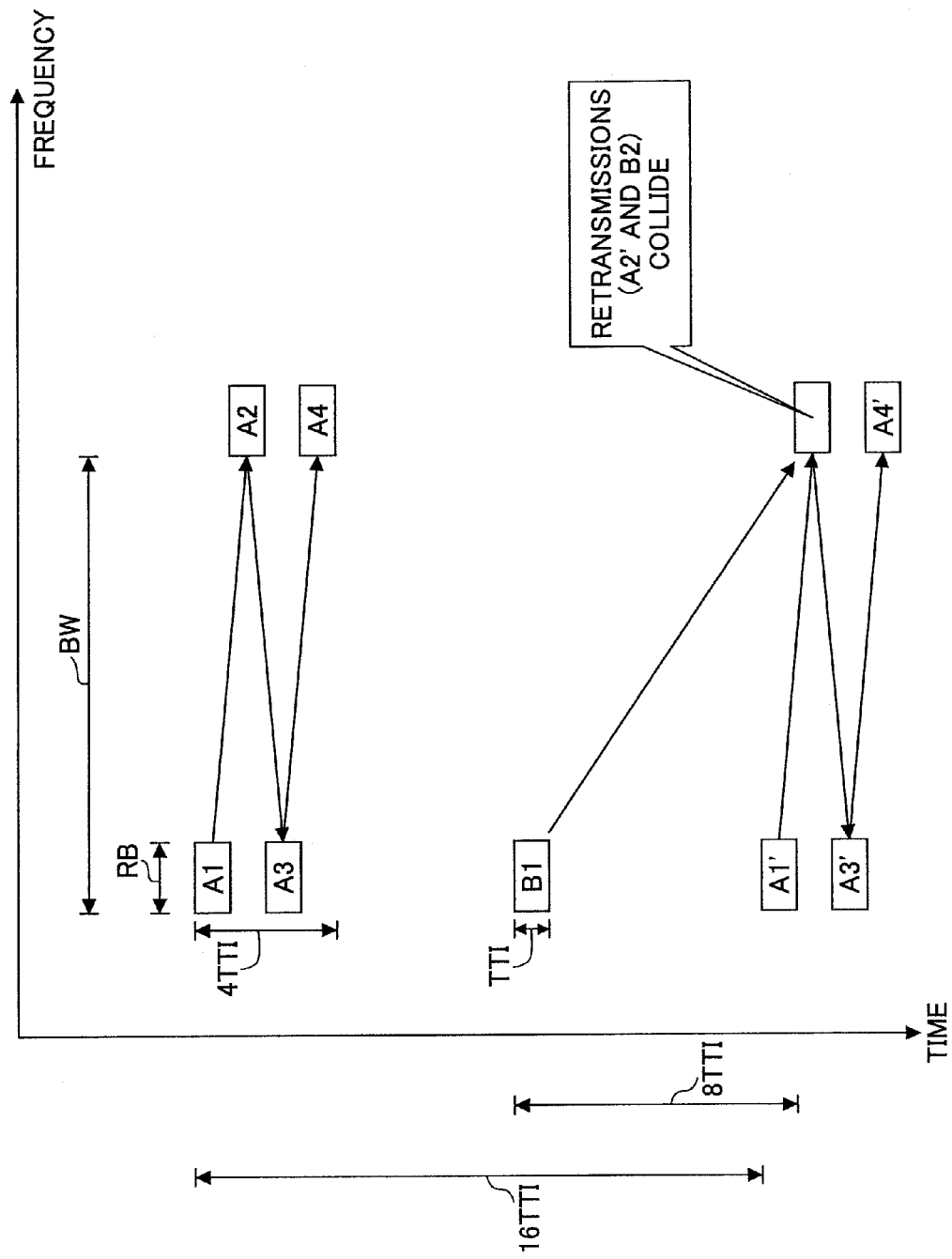
FIG. 11 is a diagram showing a problem that two user apparatuses of different RTTs use the same radio resource for respective retransmission.

Also in this case, as shown in FIG. 11, there is a problem in that collision may occur between retransmission by a user apparatus to which subframe bundling is not applied and retransmission (or transmission after the first transmission in the initial transmission) by a user apparatus to which subframe bundling is applied. Here, RTT of HARQ when subframe bundling is applied can be considered to be 1. That is, in transmission of 4 TTIs (4 subframes) in the initial transmission, each of second transmission (A2), third transmission (A3) and fourth transmission (A4) can be considered to be retransmission of RTT=1.

Figure 12:
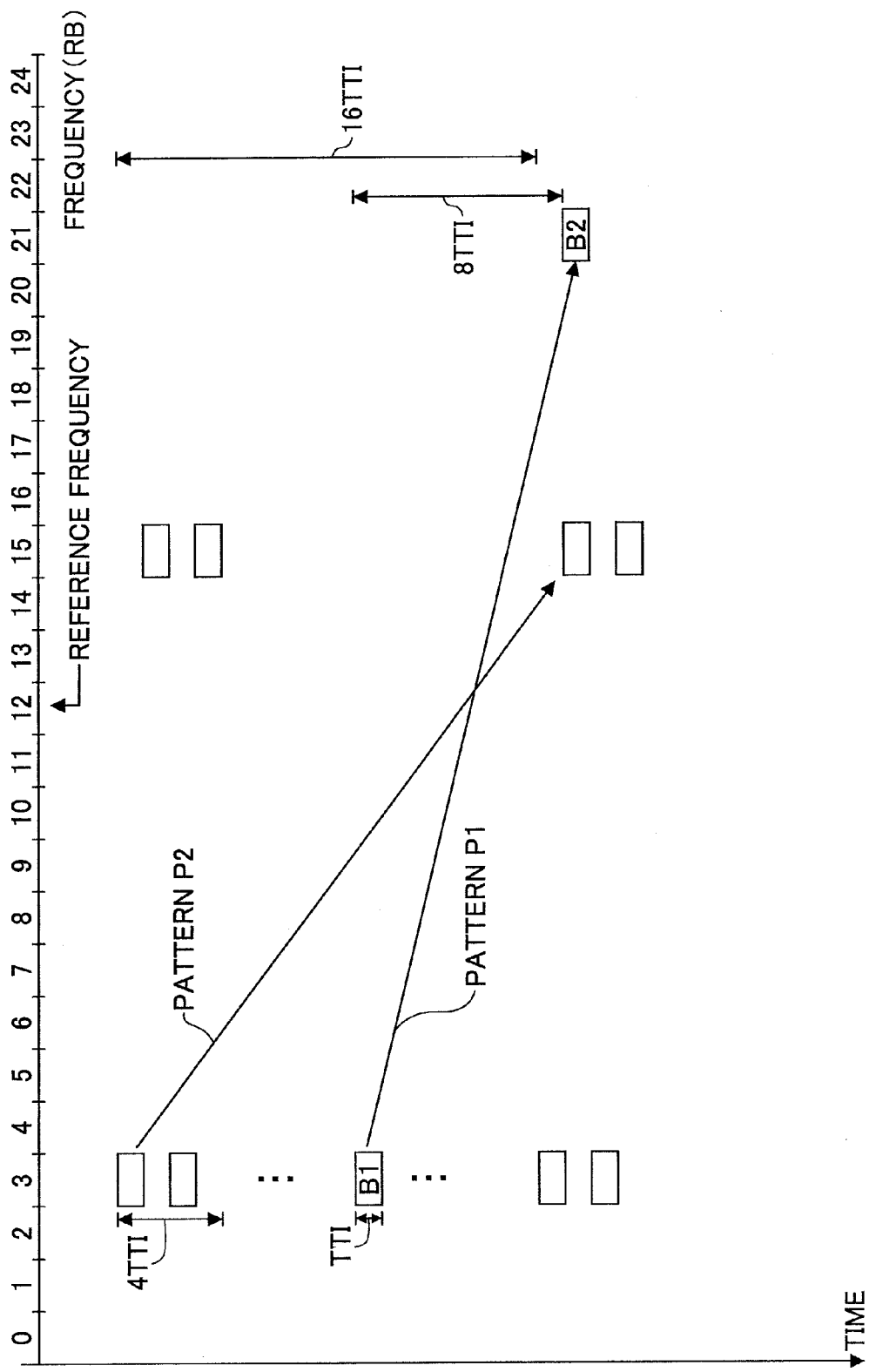
FIG. 12 is a diagram for explaining a modified example.

As shown in FIG. 12, the above-mentioned method can be applied also to this case. That is, a radio resource used by a user apparatus of the non-bundling mode for retransmission is determined according to a first frequency hopping pattern, and a radio resource used by a user apparatus of the subframe bundling mode for retransmission is determined according to a second frequency hopping pattern. Accordingly, the fear that two or more user apparatuses of different RTTs with each other use the same radio resource for respective retransmission can be reduced easily and effectively also in the above-mentioned case.

The principle of the invention, the operation example, the base station apparatus and the user apparatus are the same as those described before except that the method of hopping is different when the subframe bundling mode is applied.

The present invention can be widely applied to mobile communication systems in which the synchronization type HARQ is performed. For example, the present invention may be applied to W-CDMA systems of the HSDPA/HSUPA scheme, systems of the LTE scheme, LTE-Advanced systems, IMT-Advanced systems, WiMAX, Wi-Fi scheme systems and the like.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. Classification into each embodiment or item in the description is not essential in the present invention, and features described in equal to or more than two embodiments or items may be combined and used as necessary, and a feature described in an embodiment or an item may be applied to a feature described another embodiment or item (unless they are contradictory). For convenience of explanation, while the apparatus according to the embodiments of the present invention is explained using functional block diagrams, such an apparatus as described above may be implemented in hardware, software, or a combination thereof. The software may be stored in a storage medium of arbitrary types such as a RAM (Random Access Memory), a flash memory, a ROM (Read Only Memory), an EPROM (Erasable Programmable ROM), an EEPROM (Electronically Erasable and Programmable ROM), a register, a hard disk (HDD), a removable disk and a CD-ROM. The present invention is not limited to the above embodiments, so that variations, modifications, alternatives, and replacements are included in the present invention without departing from the spirit of the present invention.

The present international application claims priority based on Japanese patent application No. 2009-021828, filed in the JPO on Feb. 2, 2009, and the entire contents of the Japanese patent application No. 2009-021828 are incorporated herein by reference.

DESCRIPTION OF REFERENCE SIGNS 81 receiving unit (Rx) of base station apparatus
82 bundling determination unit
83 hopping mode determination unit
84 control unit
85 transmission signal generation unit
86 transmission unit (Tx) of base station apparatus
91 receiving unit (Rx) of user apparatus
92 downlink control signal analysis unit
93 control unit
94 transmission signal generation unit
95 transmission unit (Tx) of user apparatus

The invention claimed is:

1. A base station apparatus for use in a mobile communication system in which synchronization type automatic retransmission control is performed, comprising:
a determination unit configured to determine which mode of a subframe bundling mode and a non-bundling mode should be used by a user apparatus for communication;
a control signal generation unit configured to generate a control signal that includes information of a determination result; and
a transmission unit configured to transmit the control signal to the user apparatus,
wherein the control signal generation unit generates the control signal such that,
in the case of the non-bundling mode, a round trip time (RTT) from transmission of a signal by the user apparatus to retransmission of the signal is a first period, and each of transmission and retransmission of the signal is performed by a radio resource over a unit transmission period,
in the case of the subframe bundling mode, the round trip time is a second period longer than the first period, and each of transmission and retransmission of the signal is performed by a radio resource over a plurality of unit transmission periods, and
a radio resource to be used for retransmission by the user apparatus of the non-bundling mode is determined according to a first frequency hopping pattern, and a radio resource to be used for retransmission by the user apparatus of the subframe bundling mode is determined according to a second frequency hopping pattern that is different from the first frequency hopping pattern.

2. The base station apparatus as claimed in claim 1, wherein, in the first frequency hopping pattern, a radio resource used for transmission of a signal is separated from a radio resource used for retransmission of the signal by a predetermined bandwidth, and
in the second frequency hopping pattern, a bandwidth between a radio resource used for transmission of a signal and a reference frequency is the same as a bandwidth between a radio resource used for retransmission of the signal and the reference frequency.

3. The base station apparatus as claimed in claim 1, wherein, in the first frequency hopping pattern, a bandwidth between a radio resource used for transmission of a signal and a reference frequency is the same as a bandwidth between a radio resource used for retransmission of the signal and the reference frequency, and in the second frequency hopping pattern, a radio resource used for transmission of a signal is separated from a radio resource used for retransmission of the signal by a predetermined bandwidth.

4. The base station apparatus as claimed in claim 1, wherein one radio resource occupies one subframe and a predetermined frequency bandwidth, and the control signal generation unit generates the control signal such that a radio resource that becomes a start point of the first frequency hopping pattern or the second frequency hopping pattern is assigned to each user apparatus starting from a predetermined number of subframes in a low frequency side in order.

5. A method for use in a base station apparatus of a mobile communication system in which synchronization type automatic retransmission control is performed, comprising the steps of:

determining which mode of a subframe bundling mode and a non-bundling mode should be used by a user apparatus for communication;

generating a control signal that includes information of a determination result; and transmitting the control signal to the user apparatus, wherein the control signal is generated such that, in the case of the non-bundling mode, a round trip time (RTT) from transmission of a signal by the user apparatus to retransmission of the signal is a first period, and each of transmission and retransmission of the signal is performed by a radio resource over a unit transmission period, in the case of the subframe bundling mode, the round trip time is a second period longer than the first period, and each of transmission and retransmission of the signal is performed by a radio resource over a plurality of unit transmission periods, and a radio resource to be used for retransmission by the user apparatus of the non-bundling mode is determined according to a first frequency hopping pattern, and a radio resource to be used for retransmission by the user apparatus of the subframe bundling mode is determined according to a second frequency hopping pattern that is different from the first frequency hopping pattern.

6. The base station apparatus as claimed in claim 2, wherein one radio resource occupies one subframe and a predetermined frequency bandwidth, and the control signal generation unit generates the control signal such that a radio resource that becomes a start point of the first frequency hopping pattern or the second frequency hopping pattern is assigned to each user apparatus starting from a predetermined number of subframes in a low frequency side in order.

7. The base station apparatus as claimed in claim 3, wherein one radio resource occupies one subframe and a predetermined frequency bandwidth, and the control signal generation unit generates the control signal such that a radio resource that becomes a start point of the first frequency hopping pattern or the second frequency hopping pattern is assigned to each user apparatus starting from a predetermined number of subframes in a low frequency side in order.

* * * * *